US011105318B2

(12) United States Patent
Schauss et al.

(10) Patent No.: US 11,105,318 B2
(45) Date of Patent: Aug. 31, 2021

(54) METHOD FOR CALIBRATING NOMINAL FREQUENCIES

(71) Applicant: fos4X GmbH, Munich (DE)

(72) Inventors: Thomas Schauss, Gilching (DE); Florian Rieger, Munich (DE)

(73) Assignee: fos4X GmbH, Munich (DE)

( * ) Notice: Subject to any disclaimer, the term of this patent is extended or adjusted under 35 U.S.C. 154(b) by 0 days.

(21) Appl. No.: 16/958,749

(22) PCT Filed: Jun. 28, 2018

(86) PCT No.: PCT/EP2018/097078
§ 371 (c)(1),
(2) Date: Jun. 29, 2020

(87) PCT Pub. No.: WO2019/129849
PCT Pub. Date: Jul. 4, 2019

(65) Prior Publication Data
US 2020/0332774 A1 Oct. 22, 2020

(30) Foreign Application Priority Data

Dec. 28, 2017 (DE) .......................... 102017131389.3

(51) Int. Cl.
*F03D 17/00* (2016.01)
*F03D 1/06* (2006.01)

(52) U.S. Cl.
CPC .......... *F03D 17/00* (2016.05); *F03D 1/0675* (2013.01); *F05B 2270/303* (2013.01);
(Continued)

(58) Field of Classification Search
CPC .. F03D 1/0675; F03D 17/00; F05B 2270/334; F05B 2270/303; F05B 2270/32;
(Continued)

(56) References Cited

U.S. PATENT DOCUMENTS 7,224,077 B2 * 5/2007 Allen ........................ F03D 5/00
290/1 R
7,684,957 B2 * 3/2010 Ueno .................... G01S 7/4916
702/158
(Continued)

FOREIGN PATENT DOCUMENTS

DE 102013202261 A1 8/2014
EP 2746885 A1 6/2014
(Continued)

OTHER PUBLICATIONS

International Search Report for application No. PCT/EP2018/097078, dated Apr. 15, 2019.

*Primary Examiner* — Pedro J Cuevas
(74) *Attorney, Agent, or Firm* — Moser Taboada

(57) ABSTRACT

The invention relates to a method by means of which a system that is capable of oscillating can be monitored. The method comprises detection of natural oscillation modes of the system that can oscillate as a function of at least one operating parameter and/or as a function of at least one environmental parameter of the system that is capable of oscillating, creation of a frequency distribution of the detected natural oscillating modes, division of the natural oscillating modes into frequency classes and, in at least one frequency class, determination of a mode profile over the operating parameter and/or over the environmental parameter.

9 Claims, 3 Drawing Sheets

(52) U.S. Cl.
CPC ..... *F05B 2270/32* (2013.01); *F05B 2270/328* (2013.01); *F05B 2270/334* (2013.01); *F05B 2270/802* (2013.01)

(58) Field of Classification Search
CPC ......... F05B 2270/328; F05B 2270/802; Y02E 10/72
USPC .............................. 290/44, 54, 55; 356/28.5
See application file for complete search history.

(56) References Cited

U.S. PATENT DOCUMENTS

| | | | | |
|---|---|---|---|---|
| 7,911,593 B2* | 3/2011 | Ueno | ................ | G01S 17/58 356/28.5 |
| 7,961,302 B2* | 6/2011 | Ueno | ................ | G01S 7/4808 356/28.5 |
| 8,446,574 B2* | 5/2013 | Ueno | ................ | G01P 3/36 356/27 |
| 8,494,796 B2* | 7/2013 | Ueno | ................ | G01S 17/34 702/67 |
| 8,982,336 B2* | 3/2015 | Ueno | ................ | G01S 17/58 356/28.5 |
| 8,996,326 B2* | 3/2015 | Ueno | ................ | G01D 5/266 702/71 |
| 9,326,698 B2* | 5/2016 | Blanco | ................ | A61B 5/374 |
| 9,444,372 B2* | 9/2016 | Yanez Villarreal | .... | H02N 2/188 |
| 9,464,623 B2* | 10/2016 | Liu | ................ | F03D 3/068 |
| 9,856,854 B2* | 1/2018 | Yanez Villarreal | ....... | F03G 7/08 |
| 10,641,243 B2* | 5/2020 | Yanez Villarreal | .... | H02K 35/02 |
| 10,982,648 B2* | 4/2021 | Azadi Yazdi | ............. | F03D 5/06 |
| 2006/0064972 A1* | 3/2006 | Allen | ................ | F03D 5/06 60/369 |
| 2007/0176430 A1* | 8/2007 | Hammig | ................ | H02N 2/185 290/54 |
| 2008/0048455 A1* | 2/2008 | Carney | ................ | F03D 5/06 290/54 |
| 2008/0181354 A1* | 7/2008 | Ueno | ................ | G01S 17/34 377/24 |
| 2008/0277941 A1* | 11/2008 | Bowles | ................ | E21B 41/0085 290/54 |
| 2008/0304042 A1* | 12/2008 | Ueno | ................ | G01S 7/497 356/4.1 |
| 2009/0195771 A1* | 8/2009 | Ueno | ................ | G01S 7/4808 356/28.5 |
| 2009/0257067 A1* | 10/2009 | Chapman | ............ | G01B 9/02029 356/498 |
| 2010/0237719 A1* | 9/2010 | Hadas | ................ | H02K 35/04 310/38 |
| 2010/0332171 A1* | 12/2010 | Ueno | ................ | G01D 5/266 702/71 |
| 2011/0032959 A1* | 2/2011 | Ueno | ................ | G01S 7/4916 372/26 |
| 2011/0228254 A1* | 9/2011 | Ueno | ................ | G01S 17/34 356/5.09 |
| 2012/0245481 A1* | 9/2012 | Blanco | ................ | A61B 5/7264 600/544 |
| 2012/0290242 A1* | 11/2012 | Ueno | ................ | G01D 5/266 702/66 |
| 2013/0033696 A1* | 2/2013 | Ueno | ................ | G01B 9/02092 356/28.5 |
| 2013/0076036 A1* | 3/2013 | Liu | ................ | F03D 3/068 290/44 |
| 2013/0119826 A1* | 5/2013 | Yanez Villarreal | .... | H02N 2/188 310/339 |
| 2014/0175800 A1* | 6/2014 | Thorp | ................ | F03D 7/00 290/55 |
| 2016/0013737 A1* | 1/2016 | Yanez Villarreal | ....... | F03D 5/06 310/339 |
| 2016/0356264 A1* | 12/2016 | Yanez Villarreal | ....... | F03G 7/08 |
| 2017/0284365 A1* | 10/2017 | Yanez Villarreal | .... | H02N 2/185 |
| 2019/0101100 A1* | 4/2019 | Y Nez Villareal | ....... | F03D 5/06 |
| 2021/0148336 A1* | 5/2021 | Brodsgaard | ............ | G01N 3/20 |

FOREIGN PATENT DOCUMENTS

| WO | WO-2014124725 A1 | 8/2014 |
|---|---|---|
| WO | WO-2016087455 A1 | 6/2016 |

* cited by examiner

METHOD FOR CALIBRATING NOMINAL FREQUENCIES

TECHNICAL FIELD

Embodiments of the present invention relate in general to an operational modal analysis, and in particular relate to a method for calibrating nominal frequencies in the operational modal analysis. For example, rotor blades of a wind turbine or other moving structures can be monitored with regard to their oscillation properties by using such a method.

PRIOR ART

The analysis of natural frequencies or natural modes of a system delivers important information, for example about its structure and its oscillation behaviour. Once these natural frequencies or natural modes are known, it can be concluded in the event of deviations that there is a change in the state of the system structure. Many systems have variable operating parameters or are operated under different environmental parameters. Amongst others, this is the case with rotor blades of wind turbines, in which for example rotor speed, pitch angle, surface loading, attack of angle, speed of attack etc. can change in short time intervals. Apart from changes in these operating parameters, other influences, i.e. environmental parameters such as wind conditions, temperatures, ice coating, humidity etc., are also subject to constant variations. The natural frequencies and natural modes of the system are thus dependent on the operating and environmental parameters, wherein such dependence is different for each natural frequency or natural mode.

In order to be able to use a possible detection of the natural frequencies and natural modes so as to monitor a structure capable of oscillating, such as for example a rotor blade of a wind turbine, it is advantageous if nominal modes are known. Moreover, it is desirable to set these nominal modes in an automated procedure depending on operating and environmental parameters.

SUMMARY OF THE INVENTION

According to an embodiment, a method for monitoring a system capable of oscillating is provided, comprising detection of natural oscillation modes of the system capable of oscillating as a function of at least one operating parameter and/or as a function of at least one environmental parameter of the system capable of oscillating; creation of a frequency distribution of the detected natural oscillation modes as a function of a mode frequency and of at least one operating parameter and/or at least one environmental parameter; depending on the created frequency distribution, a division of the natural oscillation modes into frequency classes; and, in at least one frequency class, determination of a mode profile over the operating parameter and/or over the environmental parameter.

According to an embodiment, a method for monitoring a system capable of oscillating is provided. The method includes: detection of natural oscillation modes of the system capable of oscillating as a function of at least one operating parameter and/or as a function of at least one environmental parameter of the system capable of oscillating in at least one operating range; creation of a frequency distribution of the detected natural oscillation modes as a function of a mode frequency and of the at least one operating parameter and/or of the at least one environmental parameter in the operating range; depending on the created frequency distribution, division of the natural oscillation modes into frequency classes, wherein the division of the natural oscillation modes into frequency classes is carried out by determining a peak value of the frequency distribution of natural modes which exceeds a predetermined threshold and which has a continuity over the entire operating range; and, in at least one frequency class, determination of a mode profile over the operating parameter and/or over the environmental parameter.

According to a further embodiment, a hardware module is provided, comprising a computer program, which is configured to carry out the method for monitoring a system capable of oscillating.

BRIEF DESCRIPTION OF THE DRAWINGS

Examples of embodiment are represented in the drawings and explained in greater detail in the following description. In the drawings.

In the drawings, identical reference numbers denote identical or functionally identical components or steps.

WAYS OF PERFORMING THE INVENTION

Figure 1:
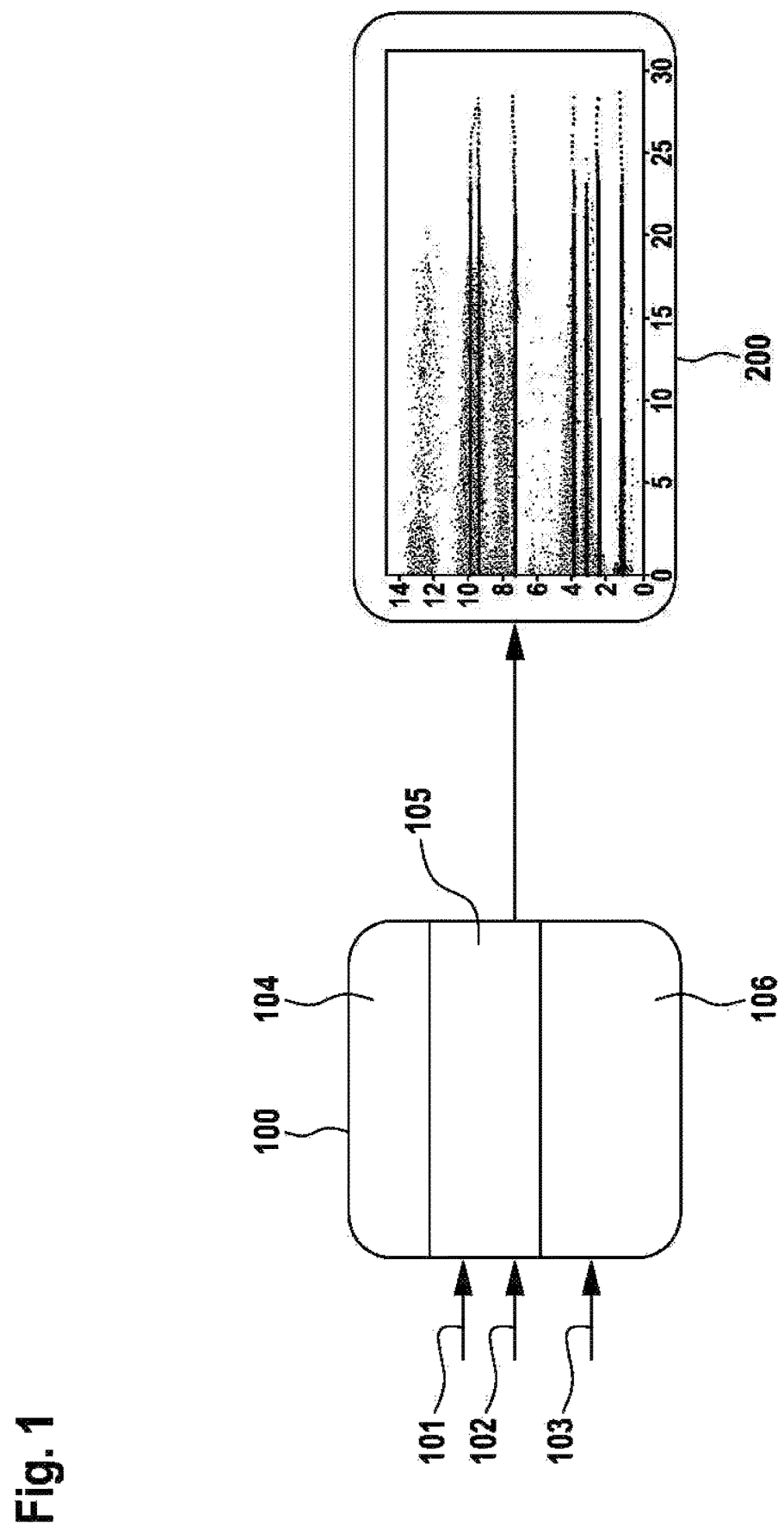
FIG. 1 shows diagrammatically a block diagram to explain the method according to an embodiment.

Detailed reference is made in the following to various embodiments of the invention, wherein one or more examples are illustrated in the drawings.

FIG. 1 shows diagrammatically an outline block diagram to explain the method according to an embodiment. In an analysis step 100, an automatic recognition of relevant natural modes, an automatic division into operating ranges and modelling of the natural modes as a function of the operating parameters takes place. For this purpose, both operating parameters 101 and also environmental parameters 102 can be inputted. Furthermore, measured natural modes 103 are known according to embodiments of the method described below and can also be processed in an analysis step 100.

As part of analysis step 100, relevant natural modes are recognised in a natural mode recognition step 104, as will be explained below by reference to FIG. 3. Furthermore, analysis step 100 comprises an operating range division step 105, which serves to carry out an automatic division into operating ranges. Furthermore, in analysis step 100, modelling of natural modes over the selected operating parameters and/or environmental parameters takes place in a modelling step 106. According to analysis step 100 shown in FIG. 1, a calibration and modelling step takes place, which, using the data outputted from analysis step 100, can provide an automated or at least partially automated recognition of relevant natural modes on the basis of a frequency distribution 200.

According to an embodiment, which can be combined with other embodiments described herein, so-called histograms are used in the automatic calibration of the nominal frequencies in the operational modal analysis. Such a histogram is designed in particular not only for representing summary measurement data such as for example an arithmetical mean value and an associated standard deviation, but also for indicating a profile of the detected frequency distribution. Thus, in the event of subsequent deviations of detected nominal natural modes, conclusions can be drawn about a change in a state of the investigated structure, such as for example a rotor blade of a wind turbine. The dependence of nominal natural modes in respect of operating parameters of the investigated structure and/or environmental parameters in the surrounding area of the investigated structure can vary for different natural modes.

In the method according to the embodiments described herein, the creation of a frequency distribution comprises the creation of a histogram. Such a histogram represents a clearly understandable graphic for the frequency distribution of specific scaled features. For the creation of a histogram, obtained measurement data are divided into classes, wherein the classes can have a constant or a variable width. Ranges lying directly beside one another thus arise, which have a total content that corresponds to a relative or absolute class frequency. A maximum value of a range can represent a relative or absolute frequency density. The frequency density can thus define the relative or absolute frequency related to the width of the corresponding class.

Figure 2:
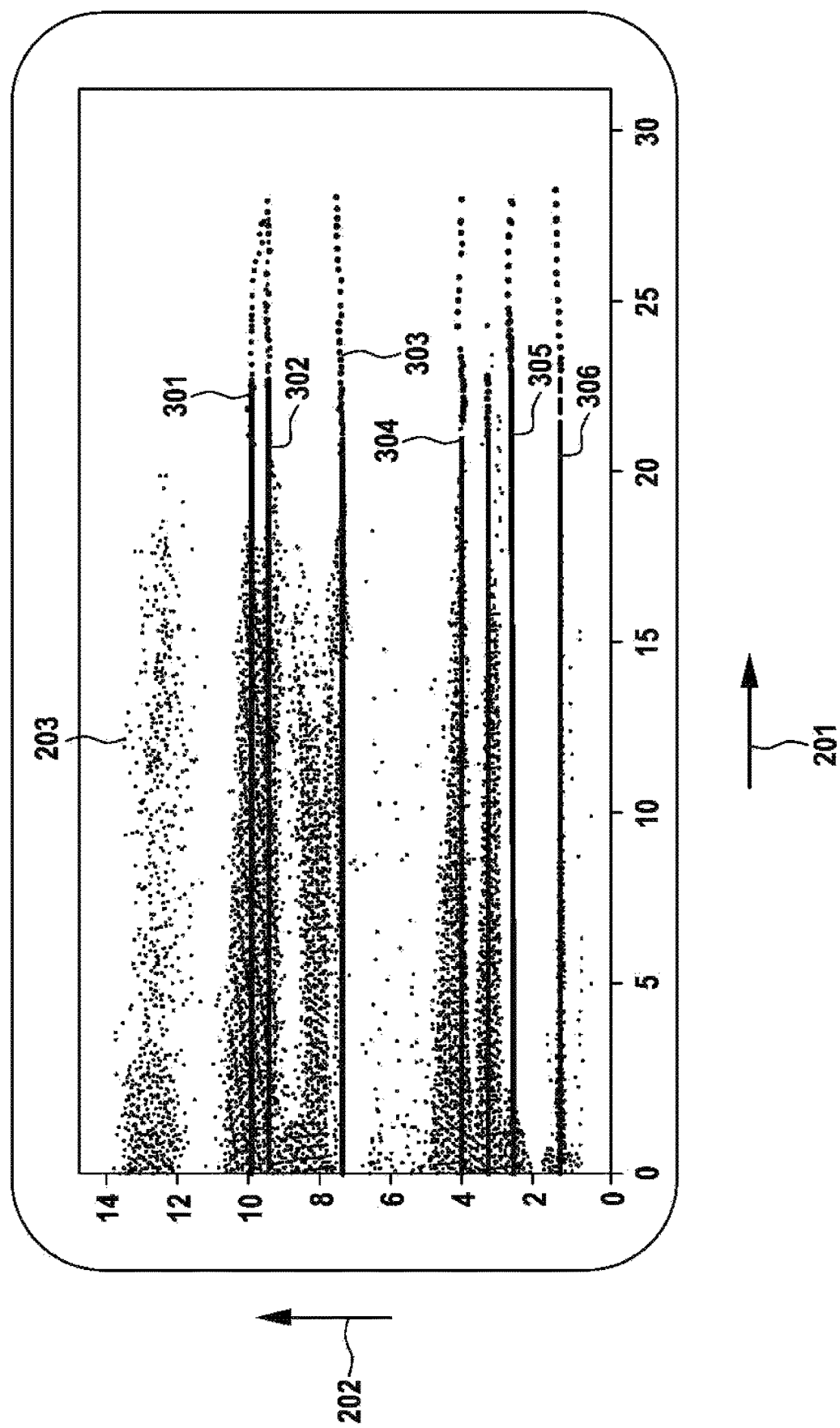
FIG. 2 and shows a histogram obtained by the method according to the embodiment shown in FIG. 1 in greater detail.

In FIG. 2, a histogram obtained by the method according to the embodiment shown in FIG. 1 is represented in a more detailed manner. FIG. 2 illustrates different frequency distributions in specific frequency classes, wherein here for example the x-axis represents an operating parameter profile 201 and the y-axis represents a frequency range division 202. In the measurement represented by way of example in FIG. 2, distinctly different mode profiles 301, 302, 303, 304, 305, 306, . . . can be seen in different frequency ranges or frequency classes 202. In calibration and modelling step 200, profiles of the natural modes can be modelled with the aid of a linear least squares approximation. A polynomial of arbitrary degree can be adapted to individual mode profiles. It is possible here to adapt either only the frequency profile or also the combined profile of frequency and mode form over the individual parameters, i.e. operating parameters and/or environmental parameters.

Individual mode profiles 301, 302, 303, 304, 305, 306, . . . emerge from the frequency distributions of individual natural frequencies 203, which are represented as single measurement points in the diagram shown in FIG. 2. Natural frequencies 203 are therefore the actually occurring frequencies in the system capable of oscillating. The histogram is then used to classify individual natural frequencies 203 by defining individual frequency classes.

Figure 3:
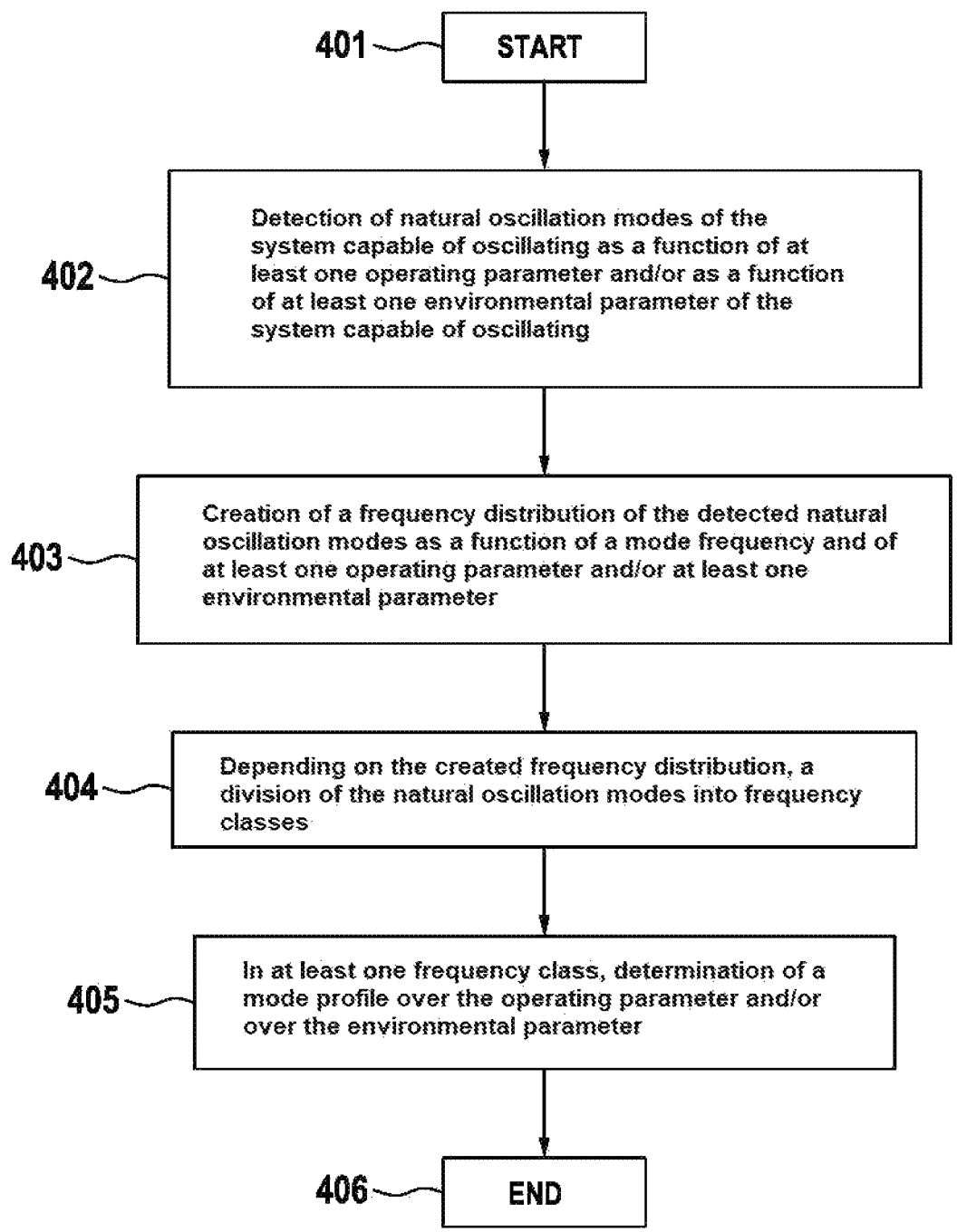
FIG. 3 shows a diagrammatic flow chart to illustrate the method for monitoring a system capable of oscillating according to an embodiment.

FIG. 3 finally shows a diagrammatic flow chart to represent a method for monitoring a system capable of oscillating according to an embodiment. The process taking place according to the method starts with a block 401. In a following block 402, oscillation modes of the system capable of oscillating are detected as a function of at least one operating parameter of the system capable of oscillating and/or as a function of at least one environmental parameter of a surrounding area of the system capable of oscillating. Such a detection can be carried out for example with oscillation sensors, in particular fibre optic oscillation sensors, preferably fibre Bragg grating sensors.

The process proceeds onward to a block 403, in which a frequency distribution of the detected natural oscillation modes is created as a function of the mode frequency and the at least one operating parameter and/or the at least one environmental parameter. Such a frequency distribution can be evaluated on the basis of a histogram. It is possible here, as represented in a block 404, to divide the natural oscillation modes into frequency classes as a function of the created frequency distribution.

In a following block 405, a mode profile over the operating parameter and/or a mode profile over the environmental parameter is determined in at least one frequency class. Such a mode profile can be used for the automatic setting or calibration of nominal modes. An evaluation of the behaviour or a profile of natural operating modes over the selected parameter is thus enabled. The procedure ends in a block 406.

In other words, relevant natural modes are identified in an automated or semi-automated manner, wherein the entire operating range is divided into frequency classes. Modelling of the natural modes as a function of the operating parameters or the environmental parameters can now be provided for each individual class. The identification of relevant natural modes is carried out in the processing of the data. Represented histogram 200 over all the recorded natural frequencies and mode forms delivers the basis for this.

According to an example of embodiment, the rotor speed in revolutions per minute is plotted on the x-axis, while the y-axis indicates the frequency classes (frequency ranges) in hertz in histogram 200 shown in FIG. 1. The determination of relevant natural modes takes place with the aid of an algorithm for finding the peak value, which can be provided for example as a kernel density function or a zero search in the derivation. As to whether a natural mode is relevant or not, this emerges from establishing whether the peak values of the natural modes are clearly distinguishable and/or whether their peak value exceeds a predetermined threshold.

According to an embodiment, which can be combined with other embodiments described herein, the monitoring of operating parameters or environmental parameters takes place continuously or discontinuously, i.e. at specific time intervals. The set operating parameters and/or the prevailing environmental parameters can significantly influence the operation of a wind turbine. For example, it is possible that flutter movements of one or more rotor blades occur in unfavourable conditions.

According to embodiments, which can be combined with other embodiments described herein, conducting the determination of the natural oscillation modes can comprise detection of foreign material on a rotor blade of a wind turbine. For example, impinging of foreign material on a rotor blade can be determined by detecting a change in a natural frequency within a frequency class.

According to a further embodiment, which can be combined with embodiments described herein, the natural oscillating modes detected in a frequency class or the mode profile detected in a frequency class can be compared with a setpoint value or with setpoint values, in order to detect deviations in operating behaviour and changes in environmental parameters in the surrounding area of the rotor blade or of the wind turbine.

According to an embodiment, which can be combined with other embodiments described herein, the at least one operating parameter of the system capable of oscillating is selected from the group which consists of: a rotor speed, a setting angle of a rotor blade, an angle of attack, a pitch angle of a rotor blade, a yaw-angle of a rotor nacelle, a generator speed, a generator power, and any combination thereof.

An operating parameter can for example be the setting angle of a rotor blade or the pitch angle. The setting angle is typically defined relative to a reference plane. The pitch angle can define an angular setting of a rotor blade with respect to a rotor hub, on which the rotor blade is rotatably mounted.

According to a further embodiment, which can be combined with other embodiments described herein, the at least one environmental parameter from the surrounding area of the system capable of oscillating is selected from the group which consists of: the ambient temperature, ice coating on a rotor blade, impinging of foreign material on a rotor blade, air humidity, a wind pressure, a wind direction, a wind speed, a surface loading on a rotor blade, an angle of attack, a speed of attack, a pressure difference, a rotor blade temperature, a rotor blade rigidity, a rotor blade mass distribution, and any combination thereof.

A wind pressure can be specified as a surface loading at a specific point of a rotor blade. Furthermore, the wind speed can be indicated as an absolute wind speed. An angle of attack can be indicated as an angle between a plane defined through the rotor blade and a wind direction. A speed of attack can define a relative speed or a relative mean speed with which ambient air strikes the rotor blade.

According to an embodiment, which can be combined with other embodiments described herein, according to the method for monitoring a system capable of oscillating, such as for example a rotor blade, natural oscillation modes of the system capable of oscillating are first detected as a function of at least one operating parameter and/or as a function of at least one environmental parameter of the system capable of oscillating. Such a detection can take place for example with oscillation sensors, in particular fibre optic oscillation sensors. After detection of the natural oscillation modes, the latter are represented in a frequency distribution, i.e. a frequency distribution of the detected natural oscillation modes is created as a function of a mode frequency and of at least one operating parameter and/or at least one environmental parameter.

The created frequency distribution is used as a basis for dividing the natural oscillation modes into frequency classes. Division of the natural oscillation modes takes place here depending on the created frequency distribution into frequency classes. It is then possible to determine a mode profile over the operating parameter and/or over the environmental parameter in the respective frequency classes. The method according to one embodiment comprises, in at least one frequency class, the mode profile over the operating parameter, the environmental parameter, or over both the operating parameter and the environmental parameter.

The division into frequency classes or a division of the entire operating range takes place on the basis of an investigation, in which continuity of the obtained peak values over the entire range is checked. If there are jumps in specific modes, or if the latter disappear and new modes appear in their place, the operating mode is divided at this point.

According to a further modification, the division of the natural oscillation modes into frequency classes takes place by determining the frequency distribution of natural modes which exceeds a predetermined threshold. In this connection, it is important that the peak values of the natural modes can be distinguished, wherein the peak values are identified which exceed the predetermined threshold. In other words, the determination as to whether a natural mode is relevant or not can be deduced from the fact that the peak values of the natural modes are clearly distinguishable and/or that a corresponding peak value exceeds a predetermined threshold.

According to an embodiment, which can be combined with other embodiments described herein, the detection of natural oscillation modes of the system capable of oscillating takes place with regard to natural frequencies, mode forms, and damping. Moreover, it is possible to determine a mode angle of individual natural modes. In other words, the detection of the oscillation modes of the system capable of oscillating includes the detection of natural frequencies and/or mode forms and/or damping and/or mode angles.

According to a modification, which can be combined with embodiments described herein, the detection of natural oscillation modes of the system capable of oscillating can take place in combination with at least one of the following: one or more natural frequencies, mode forms, mode angles and damping. Frequency and/or mode forms can thus be fitted over individual parameters such as for example operating parameters or environmental parameters.

According to a further embodiment, which can be combined with other embodiments described herein, monitoring of operating parameters of a wind turbine and/or environmental parameters in the surrounding area of a wind turbine is based on a calibration of nominal frequencies. According to a further modification, a fixing of nominal modes to be monitored in at least one frequency class can be carried out from a determined mode profile over one or more operating parameters and/or over one or more environmental parameters. According to a further embodiment, which can be combined with the other embodiments described herein, nominal modes can be fixed by adapting a polynomial of a predefined order to the frequency profile.

A process according to a further embodiment, which can be combined with its described embodiments, takes place in calibration and modelling step 200, in which the natural modes are modelled on the basis of a linear least squares process, in order to adapt in each case a polynomial of an arbitrary degree to individual mode profiles. According to a further modification thereof, it is possible to adapt either only the frequency profile or also the combined profile of frequency and mode form over the individual parameters, i.e. operating parameters and/or environmental parameters.

According to a further embodiment, which can be combined with embodiments described herein, the method permits an automatic recognition of relevant natural modes and a determination of the dependencies between individual natural modes on the one hand and operating (operational) parameters and environmental parameters (external influences). In a further modification thereof, the method permits the incorporation of a detection of damping and/or a mode angle in individual frequency classes.

According to the embodiments described herein, the result of a calibration is provided in the form of single polynomial coefficients. The values to be expected for the natural frequencies, the natural modes, the damping and mode angles can then be calculated from these coefficients at any point in time using the current operating parameters and/or the current environmental parameters. The selection of the polynomial order is made such that the mean standard deviation to be expected, which is combined from all the natural modes, is minimised. The standard deviation to be expected is calculated and averaged with the aid of a prediction band of the individual polynomials.

The method according to the embodiments described herein thus permits structures capable of oscillating to be monitored without manually determined quasi-static operating ranges having to be fixed. Thus, it is not necessary to determine constant nominal modes for an individual operating range. The method according to the embodiments described herein thus offers a considerable time saving, since an automated or at least partially automated calibration of the nominal frequencies can be provided in the operational modal analysis. The time spent on calibration can thus be markedly reduced. Only a brief control is necessary in order to check whether the calibration quality is adequate. Furthermore, it is possible to improve the quality of the calibration and to provide an option of automatically updating calibrations. A determination of nominal modes and/or nominal frequencies as a function of the operating parameters and/or environmental parameters can thus be carried out, so that recognition or monitoring of structures capable of oscillating is made available in a straightforward manner.

According to an embodiment, which can be combined with other embodiments described herein, the system capable of oscillating or the structure capable of oscillating is a rotor blade of a wind turbine.

Although the present invention has been described above on the basis of typical examples of embodiment, it is not restricted to them, but rather can be modified in a variety of ways. The invention is likewise not limited to the stated possible applications.

The invention claimed is:

1. A method for determining a mode profile, wherein the method comprises:
    detection of natural oscillation modes of the system capable of oscillating as a function of the at least one operating parameter and/or as a function of the at least one environmental parameter of the system capable of oscillating in at least one operating range;
    creation of a frequency distribution of the detected natural oscillation modes as a function of a mode frequency and of the at least one operating parameter and/or of the at least one environmental parameter in the operating range;
    depending on the created frequency distribution, division of the natural oscillation modes into frequency classes, wherein the division of the natural oscillation modes into frequency classes is carried out by determining a peak value of the frequency distribution of natural modes which exceeds a predetermined threshold and which has a continuity over the entire operating range; and
    in at least one frequency class, determination of the mode profile over the operating parameter and/or over the environmental parameter.

2. The method according to claim 1, wherein the at least one operating parameter of the system capable of oscillating is selected from the group which consists of: a rotor speed, a setting angle of a rotor blade, an angle of attack, a pitch angle of a rotor blade, a yaw-angle of a rotor nacelle, a generator speed, a generator power, and any combination thereof.

3. The method according to claim 1, wherein the at least one environmental parameter of the system capable of oscillating is selected from the group which consists of: the ambient temperature, an ice coating on a rotor blade, impinging of foreign material on a rotor blade, air humidity, a wind pressure, a wind direction, a wind speed, a surface loading on a rotor blade, an angle of attack, a speed of attack, a pressure difference, a rotor blade temperature, a rotor blade rigidity, a rotor blade mass distribution, and any combination thereof.

4. The method according to claim 1, wherein the detection of natural oscillation modes of the system capable of oscillating comprises a detection of at least one of the following parameters: one or more natural frequencies, mode forms, mode angles and damping.

5. The method according to claim 1, further comprising a fixing of nominal modes to be monitored in at least one frequency class from the determined mode profile over the operating parameter and/or over the environmental parameter.

6. The method according to claim 1, wherein the creation of a frequency distribution comprises the creation of a histogram.

7. The method according to claim 6, wherein the histogram is divided into different frequency classes.

8. The method according to claim 1, wherein the system capable of oscillating is a rotor blade of a wind turbine.

9. A hardware module, comprising a computer program which is configured to carry out the method according to claim 1.

* * * * *